No. 800,890. PATENTED OCT. 3, 1905.
P. WEBER.
PHONOGRAPHIC RECORDER.
APPLICATION FILED FEB. 6, 1901.
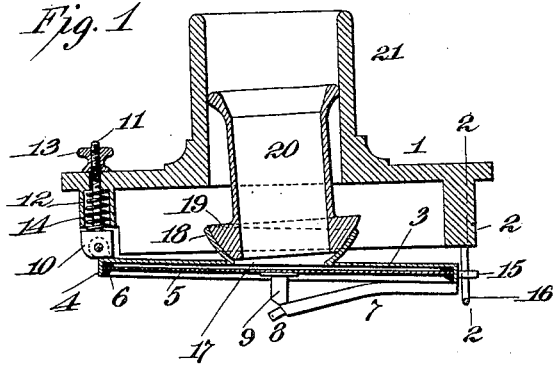
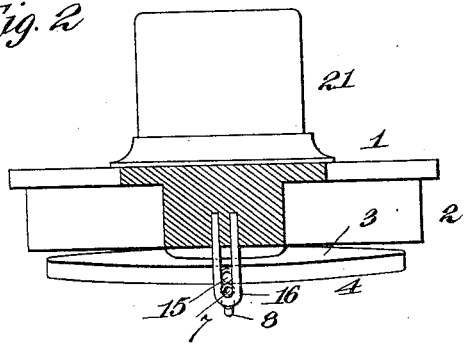
Witnesses:
Jas. F. Coleman
Jno. R. Taylor
Inventor
Peter Weber
by Dyer Edmond & Dyer
Att'ys.

UNITED STATES PATENT OFFICE.

PETER WEBER, OF EAST ORANGE, NEW JERSEY, ASSIGNOR TO NEW JERSEY PATENT COMPANY, OF ORANGE, NEW JERSEY, A CORPORATION OF NEW JERSEY.

PHONOGRAPHIC RECORDER.

No. 800,890.　　　Specification of Letters Patent.　　　Patented Oct. 3, 1905.

Application filed February 6, 1901. Serial No. 46,169.

*To all whom it may concern:*

Be it known that I, PETER WEBER, a citizen of the United States, residing at East Orange, in the county of Essex and State of New Jersey, have invented a certain new and useful Improvement in Phonographic Recorders, (Case B,) of which the following is a description.

My invention relates to various new and useful improvements in phonographic recorders; and my object generally is to simplify the construction and improve the operation of such devices.

In order that the invention may be better understood, attention is directed to the accompanying drawings, forming part of this specification, and in which—

Figure 1 is a vertical sectional view of one form of the device, and Fig. 2 a section on line 2 2 of Fig. 1.

In the above views corresponding parts are represented by the same numerals of reference.

Referring to Figs. 1 and 2, the body 1 of the recorder may either be a plain disk or be hollowed out interiorly to form a flange 2 for the purpose of lightness.

3 represents the compensating weight, which in the present instance also performs the function of a diaphragm-carrier, and to this end the weight 3 is in the form of a disk, having a peripheral flange 4 and receiving a diaphragm 5, held in place in any suitable way by means of cement 6. Secured to the flange 4 at one side is a light, preferably aluminium, arm 7, carrying the recording device 8 at one end and connected centrally to the diaphragm by a link 9, cemented or otherwise secured in place. The compensating weight 3 is pivoted at one side to a pivot-block, comprising a head 10 and a shank 11, which extends up through a chamber 12 in the flange 2 and receives above the disk 1 an adjusting-screw 13 for adjusting the compensating weight with respect to the phonogram-blank. A spring 14 in the chamber 12 normally exerts a downward stress on the head 10. At its other end the compensating weight is provided with a finger 15, working between guides 16, so that that end of the weight can vibrate vertically, but will be locked against lateral movements. The compensating weight 3 is provided at its center with an orifice 17, surrounding which is a socket 18 for receiving the spherical head 19 of a tube 20, which is adjustably movable within the usual neck 21, to which the speaking-tube is connected. The head 19 is larger than the bore of the neck 21, so that it cannot be withdrawn therethrough.

The operation of devices embodying my present improvements will be readily understood. The mass of the compensating weight causes the recording device to engage to the proper depth in the composition of the blank. Any eccentricities or variations in diameter of the blank will result in the compensating weight, diaphragm, and recording device being moved vertically up or down. The compensating weight will not, however, respond to the rapid vibrations of the recording device under the effect of the sound-waves; but so far as such vibrations are concerned it remains inert, as is now the case with devices of this type wherein such compensating weights are employed.

While I prefer to use my present improvements in connection with a phonographic recording device, it will be understood that the recording-tool 8 can be removed and a reproducer substituted therefor, and therefore in the succeeding claims I shall refer to a recording or reproducing tool generally as a "stylus."

Having now described my invention, what I claim as new, and desire to secure by Letters Patent, is as follows:

1. In a device of the class described, the combination with a body having an ascending neck, of a disk pivotally connected to said body and situated below said body, said disk being formed with a central opening, a rounded socket surrounding said opening, a diaphragm carried by said disk, a stylus connected to said diaphragm and a tube having a lower end rounded to fit said socket, said tube resting on and supported by said socket with its upper end extending into said neck, substantially as set forth.

2. In a device of the class described, the combination of a body having a depending flange and an ascending neck, of a disk pivoted to said body with a universal joint, a diaphragm carried by said disk, a stylus connected to said diaphragm and a tube leading from the disk into the space inclosed by said neck, and means for vertically adjusting said universal joint, substantially as set forth.

3. In a device of the class described, the combination of a body having a depending flange and an ascending neck, of a disk pivoted to said body with a universal joint, a diaphragm carried by said disk, a stylus connected to said diaphragm and a tube leading from the disk into the space inclosed by said neck, a nut for elevating such universal joint and a spring for depressing the same, whereby vertical adjustment thereof may be effected, substantially as set forth.

4. In a device of the class described, a diaphragm-support consisting of a disk having a peripheral flange, a central aperture and a socket surrounding said aperture, in combination with a diaphragm secured to said support within the said flange, substantially as set forth.

5. In a device of the character described, the combination with a body having an ascending neck, and a diaphragm-support pivoted to said body, said support having a central aperture and a rounded socket surrounding said aperture, of a tube whose upper end extends into said neck and whose lower end engages said socket, said lower end being greater in diameter than the bore of said neck, whereby the tube is secured against withdrawal, substantially as set forth.

6. In a device of the character described, the combination with a body having an ascending neck, and a diaphragm-support pivoted to said body, said support having a central aperture and a rounded socket surrounding said aperture, of a tube whose upper end extends into said neck and whose lower end engages said socket and means for preventing the withdrawal of said tube through said neck, substantially as set forth.

7. In a device of the character described, the combination with a body having an ascending neck, and a diaphragm-support pivoted to said body, said support having a central aperture and a rounded socket surrounding said aperture, of a tube whose upper end extends into said neck, and whose lower end is provided with a bearing-surface rounded on substantially the same curve as said socket and engages the same, substantially as set forth.

8. In a device of the character described, the combination of a body, a vertically-adjustable pivot-block carried thereby, a diaphragm-support pivoted to said pivot-block on a horizontal axis and a diaphragm carried by said support, substantially as set forth.

This specification signed and witnessed this 30th day of January, 1901.

PETER WEBER.

Witnesses:
 HARRY F. MILLER,
 J. H. MORAN.